United States Patent [19]

Franer et al.

[11] 3,975,563

[45] Aug. 17, 1976

[54] IMAGE TRANSFER SHEET MATERIAL

[75] Inventors: Victor R. Franer, Roseville; Darrell C. Burman, Bethel, both of Minn.

[73] Assignee: Minnesota Mining and Manufacturing Company, St. Paul, Minn.

[22] Filed: May 8, 1974

[21] Appl. No.: 467,898

[52] U.S. Cl. ................................ 428/143; 250/317; 427/152; 428/341; 428/474; 428/484; 428/500; 428/914; 428/918

[51] Int. Cl.[2] ........................ B41M 5/26; B32B 7/02; B32B 31/26; B41M 3/12

[58] Field of Search .................... 117/3, 4, 36.4, 72, 117/92; 428/141, 323, 341, 474, 484, 500, 914, 913, 345, 348, 349, 354, 143; 427/148, 152, 153; 250/316, 317, 318

[56] References Cited

UNITED STATES PATENTS

| | | | |
|---|---|---|---|
| 2,777,781 | 1/1957 | Kordig et al. | 117/92 X |
| 2,880,110 | 3/1959 | Miller | 117/92 X |
| 3,148,617 | 9/1964 | Roshkind | 117/3.4 UX |
| 3,595,683 | 7/1971 | Newman | 117/36.4 |

*Primary Examiner*—Douglas J. Drummond
*Assistant Examiner*—Thomas Bokan
*Attorney, Agent, or Firm*—Alexander, Sell, Steldt & DeLaHunt

[57] ABSTRACT

Sheet materials are provided which are useful in preparing negative transparencies for use with overhead projectors. Methods for obtaining image transfer and preparation of transparencies are also provided.

10 Claims, 6 Drawing Figures

IMAGE TRANSFER SHEET MATERIAL

This invention relates to material useful in image transfer techniques and, in another aspect, this invention relates to methods for obtaining image transfer and in still another aspect it relates to methods for preparing negative transparencies.

Overhead projectors and other similar devices have been commercially available for many years and have proven to be quite useful as a visual aid in teaching, presentations, etc. Various types of transparencies, and materials for preparing transparencies, have accordingly been developed for use with the overhead projectors and similar devices.

One particularly desirable teaching aid useful with, e.g., overhead projectors, is a negative transparency, i.e., a sheet or film having opaque (preferably black) background areas and lightly colored or white image areas. This type of teaching aid is quite desirable because the high contrast of white image areas on a black background causes much less eye strain than is the case with black image areas on a white background. The negative transparency also enables the user to tint certain portions of the image with colors while maintaining a sharp border between image areas and background areas.

In spite of the great desire and need for negative transparencies, however, the prior art techniques for preparing such transparencies have various drawbacks and limitations. For example, the prior art methods for preparing negative transparencies are dependent upon wet processing techniques which have obvious limitations and complications. Although wax transfer sheets are known, those sheets which are black cannot be used to make a negative transparency in a process involving infrared radiation because such sheets are highly infrared absorptive. Another type of known negative transparency comprises translucent, light scattering background areas and clear image areas. Although such negative transparencies produce a dark background on the projecting screen, the lecturer on the stage who must view the transparency on the projector is virtually blinded by the bright light.

SUMMARY OF THE INVENTION

In accordance with the present invention there are provided sheet materials useful in image transfer techniques including the making of high quality negative transparencies. In one aspect sheet material is provided comprising:

a. a thin, flexible backing which is transparent to infrared radiation;

b. a continuous, heat-fusible, visually opaque (i.e., having an optical density of at least 2.5 in the visible range) first layer coated over one major surface of said backing, said first layer having a softening point in the range of about 60°C. to 310°C., said first layer having an optical density between 0.2 and 0.7 in the infrared wavelength range (i.e., greater than 750 nanometers), and said first layer being at a coating weight in the range of about 0.4 to 1.3 grams per square foot; and c. a continuous, non-tacky, heat-fusible, infrared-transparent second layer coated over said first layer, said second layer having a softening point at least as high as said first layer, said second layer being at a coating weight in the range of about 0.1 to 0.7 grams per square foot, and said second layer having a matte surface.

In another aspect the invention provides a sheet material useful in image transfer techniques comprising:

a. a thin, flexible backing which is transparent to infrared radiation;

b. a continuous, heat-fusible, infrared-transparent, visually-transparent first layer coated over one major surface of said backing, said first layer having a softening point in the range of about 60°C. to 310°C., and said first layer being at a coating weight in the range of about 0.4 to 1.3 grams per square foot; and c. a continuous, non-tacky, heat-fusible, infrared-transparent second layer coated over said first layer, said second layer having a softening point at least as high as said first layer, said second layer being at a coating weight in the range of about 0.1 to 0.9 grams per square foot, and said second layer having a matte surface.

In another aspect the invention provides a simple method for preparing a high quality negative transparency comprising the steps of:

a. placing the two above-described novel sheets in face-to-face relation, b. superimposing said sheets over an original having infrared-absorptive image areas, c. exposing the original to infrared radiation, and d. separating the two novel sheets whereby the first and second layers of the visually opaque sheet, in areas corresponding to the image areas of the original, adhere to the second sheet and are removed from the first sheet thereby rendering the first sheet a negative transparency.

The image areas which adhere to the second sheet can be removed or transferred therefrom by means of a pressure-sensitive adhesive receptor or by exposure of the second sheet to intense infrared radiation while in contact with a suitable receptor sheet.

The invention thus provides sheet materials for making good quality negative transparencies in a dry process which is rapid and inexpensive, the process involving the use of infrared radiation. The visibly opaque sheet is sufficiently transparent to infrared radiation that it does not interfere with image transfer processes involving such radiation. On the other hand, the visually opaque material is also sufficiently absorptive of infrared radiation to permit images composed of such material to be re-transferred by means of infrared radiation transfer techniques. Since the negative transparencies are opaque to ultraviolet light as well as to visible light, they can be used as an original in processes where a light-sensitive film is exposed imagewise to ultraviolet light (e.g., in making printing plates, diazo prints, blueprints, etc.).

DETAILED DESCRIPTION OF THE INVENTION

The invention will be described in more detail hereinafter with reference to the accompanying drawings wherein like reference characters refer to the same parts throughout the several views and in which.

Figure 1:
FIG. 1 is a cross-sectional view of one embodiment of the sheet material of the invention.

In FIG. 1 there is shown one sheet material 10 of the invention comprising a thin flexible backing 12 which is transparent to infrared radiation, a continuous, heat-fusible, visually opaque (i.e., having an optical density of at least 2.5, preferably 3, in the visible wavelength range) first layer 14, and a continuous, non-tacky, heat-fusible, infrared-transparent second layer 16 coated over first layer 14. Layer 14 has an optical density between 0.2 and 0.7 (and preferably 0.5) in the infrared wavelength range (i.e., greater than 750 nanometers). First heat-fusible layer 14 has a softening point in the range of 60°C. to 310°C. and second heat-fusible layer 16 has a softening or melting point at least as high as layer 14. The coating weight of layer 14 is in the range of about 0.4 to 1.3 grams per square foot and the coating weight of layer 16 is in the range of about 0.1 to 0.7 grams per square foot.

Typically layers 14 and 16 each comprise a mixture of resin and wax. Resins which can be used include both natural and synthetic or mixtures thereof. Representative resins include rosins, hydrogenated rosins, rosin esters, copal, coumarone indene resins, polyterpene resins, phenolic rosins, vinsol, polyamide resins, vinyl resins (e.g., vinyl acetate/vinyl chloride copolymers), ketone aldehyde resins, acrylic acid ester derivative polymers (e.g., polyethyl acrylate, butyl methacrylate), polystyrene and low molecular weight styrene copolymers (e.g., M. W. 20,000 to 75,000) and other similar resins.

Waxes which can be used include natural waxes, petroleum waxes, and synthetic waxes. Representative waxes include beeswax, carnuba wax, montan wax, ceresin wax, esparte wax, candelilla wax, Japan wax, paraffin wax, petroleum microcrystalline wax, fatty diamide wax, polyester wax, and other similar waxes.

Layer 14, in addition to wax and resin, additionally contains coloring material which renders layer 14 visually opaque without rendering such layer highly infrared-absorptive. As stated above, layer 14 should have an optical density between 0.2 and 0.7 (and preferably 0.5) in the infrared wavelength range of greater than 750 nanometers. The highly preferred coloring material used is a mixture of complimentary pigments or dyes which render layer 14 black in color. Useful pigments for this purpose include phthalocyanine green, diarylide yellow, and paratoluene red.

Various additives or modifying agents such as plasticizers, fluidizing agents, lubricating agents, etc., may also be used to assist in obtaining the desired melting or fusing point for the first and second heat-fusible layers.

When preparing the composition to be used as layer 14 the resin and wax are typically mixed together by hot melt techniques or by dissolving the materials in a common solvent. The amount of wax used is typically zero to 50% by weight of the resin component with about 30% by weight being a typical loading. The desired coloring materials (preferably pigments) are then mixed in with the resin and wax. The materials may also be sand milled or ball milled together.

The heat-fusible layer 14 is readily and easily applied to the backing of the sheet material using, e.g., solvent or dispersion coating techniques. Such techniques include knife coating, roll coating, rotogravure coating, air knife coating, curtain coating, etc. Heat-fusible layer 16 is applied over layer 14 in a similar manner.

The top surface of layer 16 is not glossy or smooth but rather is a matte surface (i.e., somewhat rough or pebbled). The desired surface roughness can be obtained in various manners, although one very simple manner is to mix the desired resin and wax in such a manner that particles of about 2.0 to 10 microns (preferably about 5 microns) of wax are dispersed throughout a continuous phase of resin. This surface roughness permits air to remain between the sheet material and a receptor when making a negative transparency, the air serving as a slight insulator so as to prevent undue heating and transfer of layers 16 and 14 in areas adjacent to desired image areas.

Figure 2:
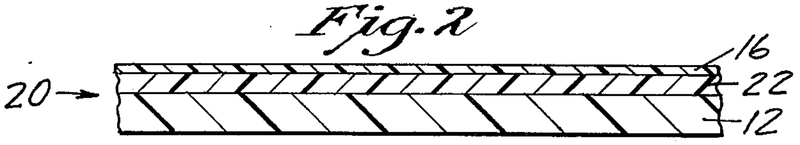
FIG. 2 is a cross-sectional view of another embodiment of the sheet material of the invention.

In FIG. 2 there is shown sheet material 20 of the invention. Sheet 20 comprises thin flexible backing 12, a continuous, heat-fusible, infrared-transparent first layer 22, and a continuous, non-tacky, heat-fusible, infrared-transparent second layer 16 coated over layer 22. First layer 22 has a softening point in the range of about 60°C. to 310°C. and second layer 16 has a softening or melting point at least as high as layer 22. The coating weight of layer 22 is in the range of 0.4 to 1.3 grams per square foot and the coating weight of layer 16 is in the range of about 0.1 to 0.9 grams per square foot.

Layer 16 has the composition, properties and characteristics described above. Layer 22 typically has the same composition as layer 14 except that layer 22 does not contain coloring material which would render the sheet material visually opaque or significantly infrared-absorptive.

Figure 3:
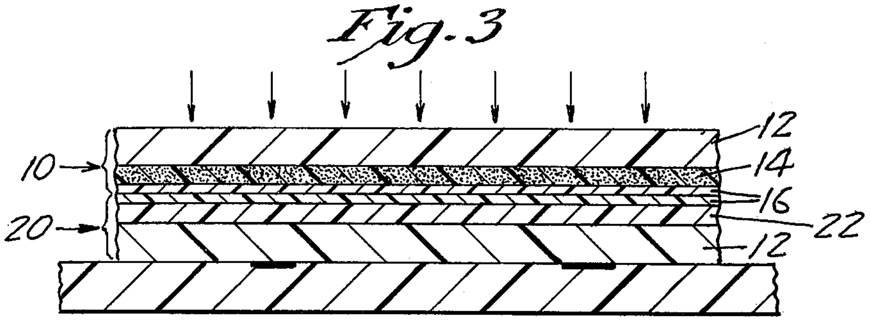
FIGS. 3 and 4 illustrates one manner in which the sheet materials of the invention are used to make a negative transparency.
Figure 4:
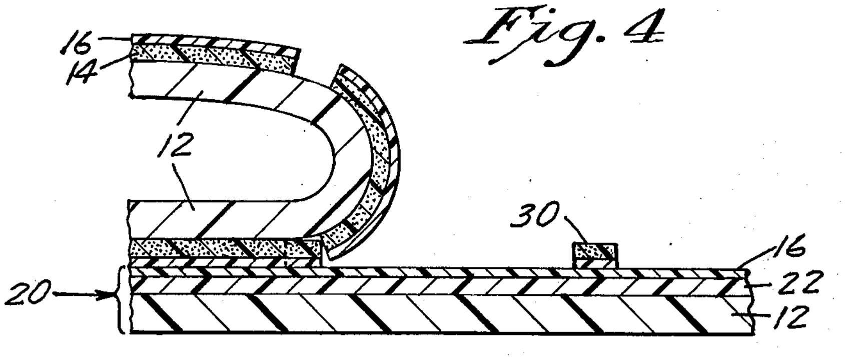
Figure 5:
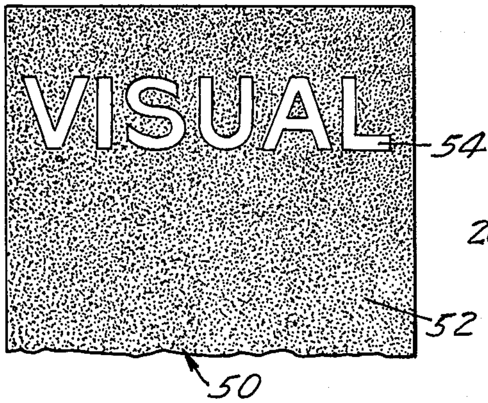
FIG. 5 is a negative transparency made in accordance with this invention.

In FIG. 3 there is shown one manner in which a negative transparency can be made according to the principles of the invention. Thus, sheet 10 is placed in face-to-face contact with sheet 20 to form a sandwich, and an original with infrared absorptive image areas is placed thereunder and exposed to infrared radiation in the manner shown. The image areas of the original absorb the infrared radiation and cause localized heating of sheet 20 and sheet 10. Upon peeling away sheet 10 as shown in FIG. 4, the portions 30 of layer 16 and layer 14 from sheet 10 corresponding to image areas remain adhered to sheet 20. The resulting sheet material which is a negative transparency is depicted in FIG. 5 as sheet 50 having a visually opaque background 52 and clear or visually transparent image areas 54.

Figure 6:
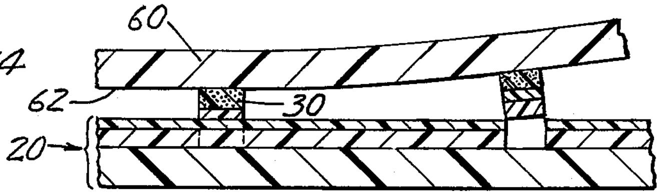
FIG. 6 illustrates one manner in which an image is transferred from a receptor or intermediate sheet to another surface.

The image portions 30 adhered to sheet material 20 can be transferred from sheet 20 in the manner shown in FIG. 6. The receptor sheet 60 may have a pressure-sensitive adhesive surface 62 which will tightly adhere to image portions 30 when receptor sheet 60 is intimately contacted therewith (the underlying portions of layers 16 and 22 being removed with portions 30). Alternatively, one may expose sheet 20 to infrared radiation for a time sufficient to cause softening of image portions 30 which can then be stripped away from sheet 20 along with underlying portions of layers 16 and 22 of sheet 20. Using these techniques one can obtain, e.g., blueprints.

The invention is illustrated by means of the following examples wherein the term "parts" refers to parts by weight unless otherwise indicated.

EXAMPLE 1

Sheet material is made having a first visually opaque layer applied to a thin flexible backing from a composition having the following ingredients:

| Ingredients | Parts |
|---|---|
| Thermoplastic polyamide resin ("Versamid 930" commercially available from General Mills) | 14.0 |
| Fatty diamide synthetic wax (atomized) ("Acrawax-C" commercially available from Glycol) | 6.2 |
| Phthalocyanine green (C. I. Pigment Green 7, C. I. 74260) ("Monastral Green" commercially available from E. I. duPont de Nemours) | 8.7 |
| Red pigment (C. I. Pigment Red 48, C. I. 15865) ("Watchtung Red" commercially available from E. I. duPont de Nemours) | 6.2 |
| Yellow pigment (C. I. Pigment Yellow 17, C. I. 21105) ("Diarylide Yellow" commercially available from Harshaw Chemical) | 1.6 |
| Isopropanol | 90.0 |
| Heptane | 90.0 |

The above ingredients are sand milled until the wax is of a particle size of 0.5 to 2.5 microns, and the composition is then applied to a thin plastic film with a conventional coating technique, followed by forced air drying to obtain a coating having a coating weight in the range of about 0.4 to 1.3 grams per square foot.

Over the top of the visually opaque layer is coated a layer of the composition having the following ingredients:

| Ingredients | Parts |
|---|---|
| Vinyl chloride/vinyl acetate copolymer ("VAGH" commercially available from Union Carbide) | 4.00 |
| Triethylene glycol dibenzoate ("Benzoflex S-358" molecular weight 358; commercially available from Vesco Chemicals) | .33 |
| Fatty diamide synthetic wax (atomized) ("Acrawax-C" commercially available from Glycol) | 10.00 |
| Methyl ethyl ketone | 28.00 |
| Isopropanol | 14.00 |
| Heptane | 14.00 |

The above ingredients are mixed together (the wax having a particle size of 2.0 to 10 microns). This composition is then coated over the visually opaque layer using a reverse roll technique followed by air forced drying until the solvent is substantially removed, after which higher temperature forced air drying is used, to leave a dry coating weight of about 0.1 to 0.7 grams per square foot.

EXAMPLE 2

Sheet material is made having a first visually transparent layer applied to a thin flexible backing from a composition having the following ingredients:

| Ingredients | Parts |
|---|---|
| Thermoplastic polyamide resin ("Versamid 930" commercially available from General Mills) | 14.0 |
| Fatty diamide synthetic wax (atomized) ("Acrawax-C" commercially available from Glycol) | 6.2 |
| Isopropanol | 90.0 |

-continued

| Ingredients | Parts |
|---|---|
| Heptane | 90.0 |

The above ingredients are sand milled until the wax is of a particle size in the range of 0.5 to 2.5 microns, and applied to a thin plastic film with a conventional coating technique, followed by forced air drying to obtain a coating having a coating weight in the range of about 0.4 to 1.3 grams per square foot.

Over the top of the first layer is coated a layer of the composition having the following ingredients:

| Ingredients | Parts |
|---|---|
| Vinyl chloride/vinyl acetate copolymer ("VAGH", commercially available from Union Carbide) | 4.00 |
| Triethylene glycol dibenzoate ("Benzoflex S-358", molecular weight 358, commercially available from Vesco Chemicals) | 0.33 |
| Fatty diamide synthetic wax (atomized) ("Acrawax-C", commercially available from Glycol) | 10.00 |
| Methyl ethyl ketone | 28.00 |
| Isopropanol | 14.00 |
| Heptane | 14.00 |

The above ingredients are mixed together (the wax having a particle size of 2.0 to 10 microns). This composition is then coated over the first layer using a reverse roll technique followed by forced air drying until the solvent is substantially removed, after which higher temperature forced air drying is used, to leave a dry coating weight of about 0.1 to 0.9 grams per square foot.

EXAMPLE 3

A negative transparency is made by first placing the coated surface of the sheet material of Example 1 in contact with the coated surface of the sheet material of Example 2 to form a sandwich. This sandwich is then positioned over an original having infrared-absorptive image areas, followed by exposure of the original to infrared radiation through the sandwich. The visually opaque sheet (of Example 1) is then separated from the sheet of Example 2 whereby portions of the visually opaque sheet (i.e., in image areas) adhere to the sheet of Example 2. A negative transparency of good quality is obtained.

The sheet of Example 2, bearing the image areas, can then be contacted with a pressure-sensitive adhesive surface and then removed therefrom so as to effect a transfer of the images to the adhesive surface. Alternatively, the sheet may be contacted with a receptor sheet and exposed to intense infrared radiation followed by removal of the receptor sheet so as to effect a transfer of the image areas to the receptor.

We claim:

1. Sheet material useful in image transfer techniques comprising:

a. a thin, flexible backing which is transparent to infrared radiation;

b. a continuous, heat-fusible, visually opaque first layer coated over one major surface of said backing, said first layer having a softening point in the range of about 60°C. to 310°C., said first layer having an optical density between 0.2 and 0.7 in the infrared wavelength range, and said first layer being at a coating weight in the range of about 0.4 to 1.3 grams per square foot; and c. a continuous, non-tacky, heat-fusible, infrared-transparent second layer coated over said first layer, said second layer having a softening point at least as high as said first layer, said second layer being at a coating weight in the range of about 0.1 to 0.7 grams per square foot, and said second layer having a matte surface.

2. Sheet material in accordance with claim 1, wherein said first layer comprises polyamide resin, wax, and an admixture of pigments.

3. Sheet material in accordance with claim 2, wherein said second layer comprises vinyl resins and a wax.

4. Sheet material in accordance with claim 1, wherein said flexible backing comprises a transparent plastic film.

5. Sheet material in accordance with claim 1, wherein said second layer comprises particles of wax dispersed throughout a continuous phase of resin, said particles being in the size range of about 2.0 to 10 microns.

6. Sheet material in accordance with claim 5, wherein said first layer comprises particles of wax dispersed throughout a continuous phase of resin, said particles being in the size range of about 0.5 to 2.5 microns.

7. Sheet material useful in image transfer techniques comprising:

a. a thin, flexible backing which is transparent to infrared radiation;

b. a continuous, heat-fusible, infrared-transparent, visually-transparent first layer coated over one major surface of said backing, said first layer having a softening point in the range of about 60°C. to 310°C., and said first layer being at a coating weight in the range of about 0.4 to 1.3 grams per square foot; and c. a continuous, non-tacky, heat-fusible, infrared-transparent second layer coated over said first layer, said second layer having a softening point at least as high as said first layer, said second layer being at a coating weight in the range of about 0.1 to 0.9 grams per square foot, and said second layer having a matte surface.

8. Sheet material in accordance with claim 7, wherein said backing comprises a transparent plastic film.

9. Sheet material in accordance with claim 7, wherein said first layer comprises polyamide resin and a wax.

10. Sheet material in accordance with claim 7, wherein said second layer comprises particles of wax dispersed throughout a continuous phase of resin, said particles being in the range of about 2.0 to 10 microns.

* * * * *